United States Patent Office 2,883,362
Patented Apr. 21, 1959

2,883,362

PREVENTING THE CRACKING OF RUBBER BY MEANS OF CERTAIN N,N,N',N'-TETRA-ALKYL-p-PHENYLENE DIAMINES

Robert H. Rosenwald, Western Springs, and Joseph A. Chenicek, Bensenville, Ill., assignors to Universal Oil Products Company, Des Plaines, Ill., a corporation of Delaware No Drawing. Application December 30, 1953
Serial No. 401,427

15 Claims. (Cl. 260—45.9)

This application relates to the stabilization of rubber and more particularly to a novel method of preventing and/or retarding cracking of rubber.

Both natural and synthetic rubbers have a tendency to undergo cracking in use when subjected to air, ozone, heat and/or light. This tendency to crack is considerably accelerated in the presence of ozone. The present invention provides a novel method of retarding and/or preventing this deterioration.

In one embodiment the present invention relates to a method of stabilizing rubber against cracking which comprises incorporating therein a stabilizing amount of an N,N,N',N'-tetra-substituted-p-phenylene diamine in which the substituents contain a total of at least 14 carbon atoms.

In a specific embodiment the present invention relates to a method of stabilizing rubber against cracking which comprises incorporating therein from about 0.001% to about 5% by weight of N,N'-di-methyl-N,N'-di-2-octyl-p-phenylene diamine.

In another embodiment the present invention relates to rubber stabilized against cracking by the inclusion therein of a stabilizing amount of an N,N,N',N'-tetra-substituted-p-phenylene diamine in which the substituents contain a total of at least 14 carbon atoms.

It will be noted that the N,N,N',N'-tetra-substituted-p-phenylene diamine compounds for use in accordance with the present invention must contain a total of at least 14 carbon atoms in the substituents and preferably from 14 to about 40 carbon atoms. Preferably the compound is symmetrical and each of the nitrogen atoms is substituted in the same manner. In a particularly preferred class of compounds, the substituents on each nitrogen atom comprise a short-chain alkyl group containing from 1 to 6 carbon atoms and a long-chain alkyl group containing from 6 to 20 carbon atoms or more. Specific compounds in this class include N,N'-di-methyl-N,N'-di-hexyl-p-phenylene diamine, N,N'-di-methyl-N,N'-di-heptyl-p-phenylene diamine, N,N'-di-methyl-N,N'-di-octyl-p-phenylene diamine, N,N'-di-methyl-N,N'-di-nonyl-p-phenylene diamine, N,N'-di-methyl-N,N'-di-decyl-p-phenylene diamine, N,N'-di-methyl-N,N'-di-undecyl-p-phenylene diamine, N,N'-di-methyl-N,N'-di-dodecyl-p-phenylene diamine, N,N'-di-methyl-N,N'-di-tridecyl-p-phenylene diamine, N,N'-di-methyl-N,N'-di-tetradecyl-p-phenylene diamine, N,N'-di-methyl-N,N'-di-pentadecyl-p-phenylene diamine, N,N'-di-methyl-N,N'-di-hexadecyl-p-phenylene diamine, N,N'-di-methyl-N,N'-di-heptadecyl-p-phenylene diamine, N,N'-di-methyl-N,N'-di-octadecyl-p-phenylene diamine, N,N'-di-methyl-N,N'-di-nonadecyl-p-phenylene diamine, N,N'-di-methyl-N,N'-di-eicosyl-p-phenylene diamine, etc., N,N'-di-ethyl-N,N'-di-hexyl-p-phenylene diamine, N,N'-di-ethyl-N,N'-di-heptyl-p-phenylene diamine, N,N'-di-ethyl-N,N'-di-octyl-p-phenylene diamine, N,N'-di-ethyl-N,N'-di-nonyl-p-phenylene diamine, N,N'-di-ethyl-N,N'-di-decyl-p-phenylene diamine, N,N'-di-ethyl-N,N'-di-undecyl-p-phenylene diamine, N,N'-di-ethyl-N,N'-di-dodecyl-p-phenylene diamine, N,N'-di-ethyl-N,N'-di-tridecyl-p-phenylene diamine, N,N'-di-ethyl-N,N'-di-tetradecyl-p-phenylene diamine, N,N'-di-ethyl-N,N'-di-pentadecyl-p-phenylene diamine, N,N'-di-ethyl-N,N'-di-hexadecyl-p-phenylene diamine, N,N'-di-ethyl-N,N'-di-heptadecyl-p-phenylene diamine, N,N'-di-ethyl-N,N'-di-octadecyl-p-phenylene diamine, N,N'-di-ethyl-N,N'-di-nonadecyl-p-phenylene diamine, N,N'-di-ethyl-N,N'-di-eicosyl-p-phenylene diamine, etc., N,N'-di-propyl-N,N'-di-hexyl-p-phenylene diamine, N,N'-di-propyl-N,N'-di-heptyl-p-phenylene diamine, N,N'-di-propyl-N,N'-di-octyl-p-phenylene diamine, N,N'-di-propyl-N,N'-di-nonyl-p-phenylene diamine, N,N'-di-propyl-N,N'-di-decyl-p-phenylene diamine, N,N'-di-propyl-N,N'-di-undecyl-p-phenylene diamine, N,N'-di-propyl-N,N'-di-dodecyl-p-phenylene diamine, N,N'-di-propyl-N,N'-di-tridecyl-p-phenylene diamine, N,N'-di-propyl-N,N'-di-tetradecyl-p-phenylene diamine, N,N'-di-propyl-N,N'-di-pentadecyl-p-phenylene diamine, N,N'-di-propyl-N,N'-di-hexadecyl-p-phenylene diamine, N,N'-di-propyl-N,N'-di-heptadecyl-p-phenylene diamine, N,N'-di-propyl-N,N'-di-octadecyl-p-phenylene diamine, N,N'-di-propyl-N,N'-di-nonadecyl-p-phenylene diamine, N,N'-di-propyl-N,N'-di-eicosyl-p-phenylene diamine, etc., N,N'-di-butyl-N,N'-di-hexyl-p-phenylene diamine, N,N'-di-butyl-N,N'-di-heptyl-p-phenylene diamine, N,N'-di-butyl-N,N'-di-octyl-p-phenylene diamine, N,N'-di-butyl-N,N'-di-nonyl-p-phenylene diamine, N,N'-di-butyl-N,N'-di-decyl-p-phenylene diamine, N,N'-di-butyl-N,N'-di-undecyl-p-phenylene diamine, N,N'-di-butyl-N,N'-di-dodecyl-p-phenylene diamine, N,N'-di-butyl-N,N'-di-tridecyl-p-phenylene diamine, N,N'-di-butyl-N,N'-di-tetradecyl-p-phenylene diamine, N,N'-di-butyl-N,N'-di-pentadecyl-p-phenylene diamine, N,N'-di-butyl-N,N'-di-hexadecyl-p-phenylene diamine, N,N'-di-butyl-N,N'-di-octadecyl-p-phenylene diamine, N,N'-di-butyl-N,N'-di-nonadecyl-p-phenylene diamine, N,N'-di-butyl-N,N'-di-eicosyl-p-phenylene diamine, etc., N,N'-di-amyl-N,N'-di-hexyl-p-phenylene diamine, N,N'-di-amyl-N,N'-di-heptyl-p-phenylene diamine, N,N'-di-amyl-N,N'-di-octyl-p-phenylene diamine, N,N'-di-amyl-N,N'-di-nonyl-p-phenylene diamine, N,N'-di-amyl-N,N'-di-decyl-p-phenylene diamine, N,N'-di-amyl-N,N'-di-undecyl-p-phenylene diamine, N,N'-di-amyl-N,N'-di-dodecyl-p-phenylene diamine, N,N'-di-amyl-N,N'-di-tridecyl-p-phenylene diamine, N,N'-di-amyl-N,N'-di-tetradecyl-p-phenylene diamine, N,N'-di-amyl-N,N'-di-pentadecyl-p-phenylene diamine, N,N'-di-amyl-N,N'-di-hexadecyl-p-phenylene diamine, N,N'-di-amyl-N,N'-di-heptadecyl-p-phenylene diamine, N,N'-di-amyl-N,N'-di-octadecyl-p-phenylene diamine, N,N'-di-amyl-N,N'-di-nonadecyl-p-phenylene diamine, N,N'-di-amyl-N,N'-di-eicosyl-p-phenylene diamine, etc., N,N,N',N'-tetra-hexyl-p-phenylene diamine, N,N'-di-hexyl-N,N'-di-heptyl-p-phenylene diamine, N,N'-di-hexyl-N,N'-di-octyl-p-phenylene diamine, N,N'-di-hexyl-N,N'-di-nonyl-p-phenylene diamine, N,N'-di-hexyl-N,N'-di-decyl-p-phenylene diamine, N,N'-di-hexyl-N,N'-di-undecyl-p-phenylene diamine, N,N'-di-hexyl-N,N'-di-dodecyl-p-phenylene diamine, N,N'-di-hexyl-N,N'-di-tridecyl-p-phenylene diamine, N,N'-di-hexyl-N,N'-di-tetradecyl-p-phenylene diamine, N,N'-di-hexyl-N,N'-di-pentadecyl-p-phenylene diamine, N,N'-di-hexyl-N,N'-di-hexadecyl-p-phenylene diamine, N,N'-di-hexyl-N,N'-di-heptadecyl-p-phenylene diamine, N,N'-di-hexyl-N,N'-di-octadecyl-p-phenylene diamine, N,N'-di-hexyl-N,N'-di-nonadecyl-p-phenylene diamine, N,N'-di-hexyl-N,N'-di-eicosyl-p-phenylene diamine, etc. The long chain substituent preferably is attached to the nitrogen atom on a non-terminal carbon atom.

The compounds herein specifically set forth above comprise those in which all of the substituents are alkyl groups. In another embodiment the substituents may include alkenyl groups as in compounds including, for example, N,N'-di-methyl-N,N'-dihexenyl - p-phenylene diamine, N,N'-di-methyl-N,N'-di - heptenyl-p-phenylene diamine, N,N'-di-methyl-N,N'-di-octenyl-p-phenylene diamine, N,N'-di-methyl-N,N'-di-nonenyl-p-phenylene diamine, N,N'-di-methyl-N,N'-di-decenyl-p-phenylene diamine, N,N'-di-methyl-N,N'-di-undecenyl-p-phenylene diamine, N,N'-di-methyl-N,N'-di-dodecenyl-p-phenylene diamine, etc., N,N'-di-ethyl-N,N'-di-hexenyl-p-phenylene diamine, N,N'-di-ethyl-N,N'-di-heptenyl-p-phenylene diamine, N,N'-di-ethyl-N,N'-di-octenyl-p-phenylene diamine, N,N'-di-ethyl-N,N'-di-nonenyl-p-phenylene diamine, N,N'-di-ethyl-N,N'-di-decenyl-p-phenylene diamine, N,N'-di - ethyl - N,N'-di-undecenyl-p-phenylene diamine, N,N'-di-ethyl-N,N'-di-dodecenyl-p-phenylene diamine, etc., N,N'-di-propyl-N,N'-di-hexenyl-p-phenylene diamine, N,N'di-propyl-N,N'-di-heptenyl-p-phenylene diamine, N,N'-di-propyl-N,N'-di-octenyl-p-phenylene diamine, N,N'-di-propyl-N,N'-di-nonenyl-p-phenylene diamine, N,N'-di-propyl-N,N'-di-decenyl-p-phenylene diamine, N,N'-di-propyl-N,N'-di-undecenyl-p-phenylene diamine, N,N'-di-propyl-N,N'-di-dodecenyl-p-phenylene diamine, etc., N,N'-di-butyl-N,N'-di-hexenyl-p-phenylene diamine, N,N'-di-butyl-N,N-di-heptenyl-p-phenylene diamine, N,N'-di-butyl - N,N'-di-octenyl-p-phenylene diamine, N,N'-di-butyl - N,N'-di-nonenyl-p-phenylene diamine, N,N'-di-butyl - N,N'-di-decenyl-p-phenylene diamine, N,N'-di-butyl-N,N'-di-undecenyl-p-phenylene diamine, N,N'-di-butyl-N,N'-di-dodecenyl-p-phenylene diamine, etc.

As hereinbefore set forth the preferred compound comprises those in which the substituents on each of the nitrogen atoms are the same. In another embodiment, these substituents may be different and may comprise groups of different chain length and/or different chain structure, as well as saturated and unsaturated substituents. Illustrative compounds include N,N'-di-methyl-N-hexyl-N'-heptyl-p-phenylene diamine, N,N'-di-methyl-N-hexyl-N'-octyl-p-phenylene diamine, N,N'di-methyl-N-hexyl-N'-nonyl-p-phenylene diamine, etc., N,N'-di-methyl-N-heptyl-N'-octyl-p-henylene diamine, N,N'di-methyl-N-heptyl-N'-nonyl-p-phenylene diamine, N,N'-di-methyl-N-heptyl-N'-decyl-p-phenylene diamine, etc., N,N'-di-ethyl-N-hexyl-N'-heptyl-p-phenylene diamine, N,N'-di-ethyl-N-hexyl-N'-octyl-p-phenylene diamine, N,N'-di-ethyl-N-hexyl-N'-nonyl-p-phenylene diamine, etc., N,N'-di-ethyl-N-heptyl-N'-octyl-p-phenylene diamine, N,N'-di-ethyl-N-heptyl-N'-nonyl-p-phenylene diamine, N,N'-di-ethyl-N-heptyl-N'-decyl-p-phenylene diamine, etc., N - methyl-N-hexyl-N'-ethyl-N'-heptyl-p-phenylene diamine, N-ethyl-N-hexyl-N'-propyl-N'-heptyl-p - phenylene diamine, N-methyl-N-dodecyl - N'-butyl-N'-tridecyl-p-phenylene diamine, etc., N,N'-di-methyl-N-hexyl-N'-octenyl-p-phenylene diamine, N,N'-di-methyl-N-octyl-N'-tridecenyl-p-phenylene diamine, etc., N,N'-di-methyl-N-2 - tridecyl-N'-4-tridecyl-p-phenylene diamine, N,N'-di-methyl - N - 2 - tridecyl-N'-4-(2-methyl-heptadecyl)-p-phenylene diamine, etc.

The aliphatic substituents may be straight or branched chain. The branched chain group may contain one or more branching in the chain as, for example, in such compounds as N,N'-di-methyl-N,N'-di-4-(2-methyl-tridecyl)-p-phenylene diamine prepared by the reductive alkylation of p-phenylene diamine or p-nitroaniline with isobutyl nonyl ketone, followed by reductive alkylation with formaldehyde, N,N' - di-ethyl-N,N'-di-4-(2,6-dimethyl-heptyl)-p-phenylene diamine prepared by the reductive alkylation of p-nitroaniline with di-isobutyl ketone, followed by reductive alkylation with acetaldehyde, etc.

The compounds for use in accordance with the present invention may be prepared in any suitable manner. A preferred method is by the reductive alkylation of p-phenylene diamine or p-nitroaniline with a suitable ketone or aldehyde. A particularly preferred method comprises the reductive alkylation of p-phenylene diamine or p-nitroaniline with a ketone or aldehyde, preferably a ketone, containing at least 6 carbon atoms to form the corresponding N,N'-di-substituted-p-phenylene diamine, and then reductive alkylation thereof with an aldehyde or ketone, preferably an aldehyde, containing not more than 6 carbon atoms. Any suitable catalyst may be utilized for effecting the reactions, a preferred catalyst comprising a mixture of the oxides of chromium, copper and barium. Other catalysts include those containing cobalt, nickel, platinum, palladium, molybdenum, etc. In general the first reductive alkylation is effected at an elevated temperature of from about 100° to about 250° C. and a hydrogen pressure of from about 3 to about 200 atmospheres. The second reductive alkylation usually is effected at a lower temperature, which may range from atmospheric to about 150° C. The specific temperatures to be employed will depend upon the particular reactants and catalyst utilized.

When the additive compound includes alkenyl groups, it may be prepared by the reaction of p-phenylene diamine or p-nitroaniline with mesityl oxide, vinyl butyl ketone, phorone, vinyl amyl ketone, vinyl hexyl ketone, vinyl heptyl ketone, vinyl octyl ketone, vinyl nonyl ketone, vinyl decyl ketone, etc., allyl butyl ketone, allyl amyl ketone, allyl hexyl ketone, allyl heptyl ketone, allyl octyl ketone, allyl nonyl ketone, allyl decyl ketone, etc. This reaction is effected in substantially the same manner as hereinbefore set forth and, depending upon the extent of hydrogenation, may comprise compounds containing unsaturated side-chains or a mixture of compounds containing unsaturated and saturated side-chains as, for example, a mixture of N,N'-di-methyl-N,N'-di-hexenyl-p-phenylene diamine, N,N'-di-methyl-N-hexenyl-N'-hexyl-p-phenylene diamine and N,N'-di-methyl-N,N'-di-hexyl-p-phenylene diamine.

The phenylene diamine may contain, in addition to the nitrogens, one or more substituents attached to the phenylene nucleus. The substituent preferably comprises a hydrocarbon group, including alkyl, alkenyl, aryl, alkaryl, aralkyl, cycloalkyl, etc., although it may contain ovygen, nitrogen and/or sulfur. It is understood that the various additive compounds which may be prepared and used in accordance with the present invention are not necessarily equivalent.

The additive of the present invention may be incorporated in rubber or rubbery products in any suitable manner and at any suitable stage of preparation. In general, the additive will be utilized in an amount of from about 0.001% to about 5% by weight of the rubber, although in some cases higher or lower concentrations may be employed. It is understood that the additives of the present invention may be utilized along with other additives incorporated in rubber for specific purposes, including accelerators, softeners, etc.

The additives of the present invention may be utilized in any rubber composition subject to cracking or other deterioration, including those used for automobile tires and tubes, hose, belting, sheet and thread rubber, rubberized fabrics, molded goods, boots and shoes, etc., whether vulcanized in a mold, in open steam, in hot air, or in the cold by the so-called acid process. In another embodiment the present invention may be utilized for the stabilization of plastics, adhesives, elastomers, etc., which tend to crack or otherwise deteriorate in storage or in use. When the additive is added to a liquid, such as rubber pigment or an oil, it may be dissolved therein in the desired proportions. When it is to be added to a solid substance, it may be incorporated therein by milling, mastication, etc. The additive may be utilized as such or as a solution or dispersion, or as a powder, paste, etc.

It is understood that the term rubber as used herein is intended to include both natural and synthetic rubber, including those produced by the reaction of butadiene and styrene, butadiene and acrylonitrile, etc., as well as reclaims and latices of rubber materials, whether or not admixed with fillers, pigments, accelerating agents, etc.

The following examples are introduced to illustrate further the novelty and utility of the present invention but not with the intention of unduly limiting the same.

*Example I*

N,N' - di - methyl - N,N' - di - 2 - octyl - p - phenylene diamine was prepared as follows: N,N'-di-2-octyl-2-p-phenylene diamine was prepared by the reductive alkylation of p-nitroaniline with methyl hexyl ketone. This product was then reductively alkylated with formaldehyde, the final product having a boiling point of 212–220° C. at a pressure of 3 mm. of mercury.

3% by weight of N,N'-di-methyl-N,N'-di-2-octyl-p-phenylene diamine prepared in the above manner is incorporated in a commercial rubbery butadiene-styrene copolymer composition containing the usual ingredients including carbon black, zinc oxide, sulfur, etc. The ingredients are combined on a rubber mill in the conventional manner and then the mix is cured.

Upon exposure to ozone in a concentration of 100 parts of ozone per 100 million parts of air, the rubber containing N,N'-di-methyl-N,N'-di-2-octyl-p-phenylene diamine undergoes less cracking than is encountered in a similar rubber not containing the additive.

*Example II*

N,N' - di - methyl - N,N' - di - 2 - decyl - p - phenylene diamine is prepared by the reductive alkylation of N,N'-di-2-decyl-p-phenylene diamine with formaldehyde. The N,N'-di-2-decyl-p-phenylene diamine is prepared by the reductive alkylation of p-phenylene diamine with methyl octyl ketone.

The resulting additive may be incorporated in a concentration of 2.5% by weight in a synthetic mixture similar to that described in Example I, and serves to retard cracking of the rubber produced therefrom.

*Example III*

N,N' - di - butyl - N,N' - di - 4 - dodecyl - p - phenylene diamine is prepared by the reductive alkylation of phenylene diamine with propyl octyl ketone and then by reductive alkylation with butyraldehyde. The resulting additive may be incorporated in a concentration of 2% by weight in rubber, and will serve to retard cracking of the rubber.

*Example IV*

N,N' - di - methyl - N,N' - di - cyclohexyl - p - phenylene diamine, is prepared by the reductive alkylation of p-phenylene diamine with cyclohexanone, followed by reductive alkylation of the product with formaldehyde. The resulting additive may be incorporated in a concentration of 3% by weight in elastomers to retard cracking thereof.

We claim as our invention:

1. A sulfur vulcanizable rubber normally subject to cracking containing, in sufficient amount to retard said cracking, a p-phenylene diamine having attached to each of its nitrogen atoms an alkyl group of from 1 to 6 carbon atoms and an alkyl group of from 6 to 20 carbon atoms and containing a greater number of carbon atoms than said first mentioned alkyl group.

2. A sulfur vulcanizable rubber normally subject to cracking containing, in sufficient amount to retard said cracking, a p-phenylene diamine having attached to each of its nitrogen atoms a methyl group and an alkyl group of from 6 to 20 carbon atoms.

3. A sulfur vulcanizable rubber normally subject to cracking containing N,N'-di-methyl-N,N'-di-octyl-p-phenylene diamine in sufficient amount to retard said cracking.

4. A sulfur vulcanizable rubber normally subject to cracking containing N,N'-di-methyl-N,N'-di-2-octyl-p-phenylene diamine in sufficient amount to retard said cracking.

5. A sulfur vulcanizable rubber normally subject to cracking containing N,N'-di-methyl-N,N'-di-nonyl-p-phenylene diamine in sufficient amount to retard said cracking.

6. A sulfur vulcanizable rubber normally subject to cracking containing N,N'-di-methyl-N,N'-di-decyl-p-phenylene diamine in sufficient amount to retard said cracking.

7. A sulfur vulcanizable rubber normally subject to cracking containing N,N'-di-methyl-N,N'-di-undecyl-p-phenylene diamine in sufficient amount to retard said cracking.

8. A sulfur vulcanizable rubber normally subject to cracking containing N,N'-di-methyl-N,N'-di-dodecyl-p-phenylene diamine in sufficient amount to retard said cracking.

9. A sulfur vulcanizable rubber normally subject to cracking containing from about 0.001% to about 5% by weight of an N,N,N',N'-tetra-substituted-p-phenylene diamine in which each nitrogen atom is substituted by both an alkyl group containing from 1 to 6 carbon atoms and a larger alkyl group containing from 6 to 20 carbon atoms.

10. A sulfur vulcanizable rubber normally subject to cracking containing from about 0.001% to about 5% by weight of N,N'-di-methyl-N,N'-di-octyl-p-phenylene diamine.

11. A sulfur vulcanizable rubber normally subject to cracking containing from about 0.001% to about 5% by weight of N,N'-di-methyl-N,N'-di-2-octyl-p-phenylene diamine.

12. A sulfur vulcanizable rubber normally subject to cracking containing from about 0.001% to about 5% by weight of N,N'-di-methyl-N,N'-di-nonyl-p-phenylene diamine.

13. A sulfur vulcanizable rubber normally subject to cracking containing from about 0.001% to about 5% by weight of N,N'-di-methyl-N,N'-di-decyl-p-phenylene diamine.

14. A sulfur vulcanizable rubber normally subject to cracking containing from about 0.001% to about 5% by weight of N,N'-di-methyl-N,N'-di-undecyl-p-phenylene diamine.

15. A sulfur vulcanizable rubber normally subject to cracking containing from about 0.001% to about 5% by weight of N,N'-di-methyl-N,N'-di-dodecyl-p-phenylene diamine.

References Cited in the file of this patent

UNITED STATES PATENTS

| | | |
|---|---|---|
| 2,115,473 | Semon | Apr. 26, 1938 |
| 2,266,576 | Tuley et al. | Dec. 16, 1941 |
| 2,395,382 | Walters | Feb. 19, 1946 |
| 2,451,642 | Watson | Oct. 19, 1948 |